Patented Mar. 2, 1943

2,312,923

UNITED STATES PATENT OFFICE 2,312,923

MOTHPROOFING COMPOSITION

Henry Martin, Basel, Hans Zaeslin, Riehen, near Basel, and Curt Glatthaar and Alfred Staub, Basel, Switzerland, assignors to the firm J. R. Geigy A. G., Basel, Switzerland No Drawing. Application December 20, 1940, Serial No. 371,051. In Switzerland December 11, 1939

7 Claims. (Cl. 167—37)

It has been found that quaternary cyclic amidines of the general formula

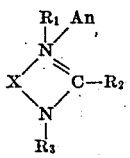

wherein $R_1$ means a high-molecular aliphatic or a benzyl radical, $R_2$ means an aliphatic, araliphatic, aromatic, hydroaromatic or heterocyclic radical, $R_3$ means an alkyl, benzyl or aryl radical, X means any radical which connects both nitrogen atoms and may also belong to a further ring system; and An means any anion, possess in aqueous solution a remarkable drawing or fixing power on animal fibres and the like and that such fibres treated therewith are permanently protected against pests.

Water-soluble, open amidines have already been used as moth-proofing agents. However, the cyclic amidines of the above general formula are by far superior to those compounds with respect to their fastness to washing and fulling. Quaternary cyclic amidines have hitherto only been proposed in the textile industry for rendering direct colored natural or regenerated cellulose fast to water. From this behaviour, however, neither the drawing power on wool, feathers, furs and so on, nor the moth-proofing effect could be gathered or derived.

The water-soluble cyclic quaternary amidines being here used are known for the most part. They may be obtained according to known processes such as for instance by alkylation or aralkylation of imidazols such as benzimidazols. Thus N-alkylated, -aralkylated or -arylated benzimidazols which may be alkylated, aralkylated or arylated in the my-position can in presence or absence of solvents be alkylated or aralkylated. First of all derivatives substituted by halogen atoms are especially suitable. However, also halogen-free imidazols such as the compound of the formula

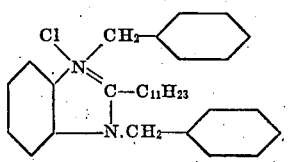

afford a good protection against moths.

The invention is illustrated by the following examples, without being limited thereby, the parts being by weight where nothing other is said.

Example 1

20 parts of 1-(p-ethoxyphenyl)-2-methyl-benzimidazol and 24 parts of 3:4-dichlorobenzylchloride are stirred in 50 parts of chlorobenzene during 2 days at 90–100° C. In the course of the said time the quaternary salt separates out in a crystalline form. It is sucked off and washed with chlorobenzene. Yield 76%. After drying it forms a colorless powder clearly soluble in hot-water. It possesses the following formula:

The 1-(p-ethoxyphenyl)-2-methyl-benzimidazol may be prepared as follows:

0.5 part of 2-nitro-4'-ethoxydiphenylamine (Ber. 26, 683 (1893)) are dissolved in 10 parts by volume of glacial acetic acid, whereupon 0.5 part of zinc-powder is added thereto by small portions. After a short heating on the water-bath the glacial acetic acid is distilled off in vacuo, the residue is shaken out with 0.2 n-caustic soda lye until all zinc goes in solution, and thereupon extracted with ether. The ethereal solution is shaken out with much 0.2 n-hydrochloric acid (difficultly soluble chlorhydrate), this aqueous solution is made alkaline with sodium carbonate and once more shaken out with ether, whereupon the ethereal solution is dried over potassium carbonate and concentrated by evaporation. The obtained product is recrystallised from benzine, B. P. 100–110° C., and then sublimated in molecular form at a pressure of 0.01 mm. between 120 and 150° C. The 2-amino-4'-ethoxydiphenylamine forms colorless prismatic crystals and melts at 93–94° C.

100 parts of 2-amino-4'-ethoxydiphenylamine are shortly boiled with acetic acid anhydride. After concentration by evaporation in vacuo the mixture is absorbed in ether, shaken out with 2 n-caustic soda lye, the obtained solution is made alkaline with sodium carbonate, shaken out with ether, then dried over potassium carbonate and evaporated. The obtained product is recrystallised from benzine, B. P. 100–110° C., or distilled in high vacuo, B. P. at 0.2–0.3 mm. 200–210° C.

The obtained colorless prisms, i. e. the 1-(p-ethoxyphenyl) - methylbenzimidazo, melt at 126–128° C.

The benzimidazols substituted in the my-aryl have been proved as being very efficacious; as examples the following compounds may be mentioned:

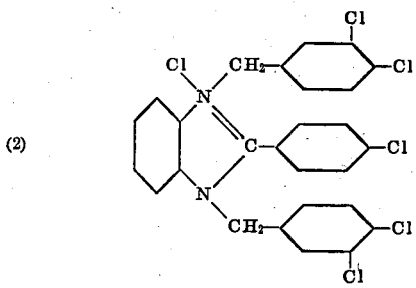
(2)

Made by reduction of 4-chlorobenzoyl-o-nitraniline, dehydration at 180–200° C. to the imidazol and peralkylation with 3:4-dichlorobenzylchloride to trichlorobenzene.

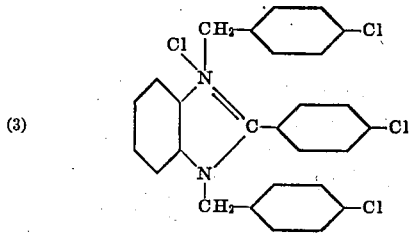
(3)

Prepared as described in Example 2, but peralkylation with p-chlorobenzylchloride.

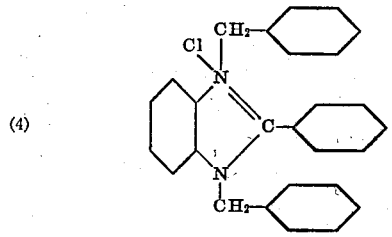
(4)

Made by reduction of benzoyl-o-nitraniline, dehydration at 180–200° C. and peralkylation with benzylchloride.

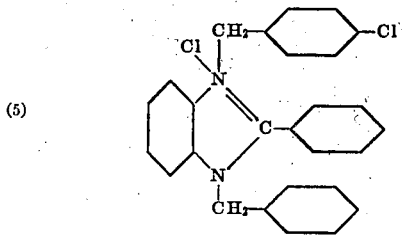
(5)

Made by reduction of benzoyl-o-nitraniline, dehydration at 180–200° C. to the imidazol, alkylation with benzylchloride at 160–170° C. and transformation of the free base into the quaternary salt by means of p-chlorobenzylchloride.

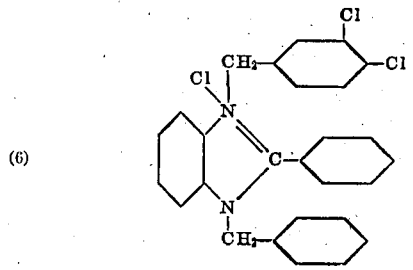
(6)

As under (5), but transformation of the 2-phenyl-N-benzylimidazol into the quaternary salt by means of 3:4-dichlorobenzylchloride.

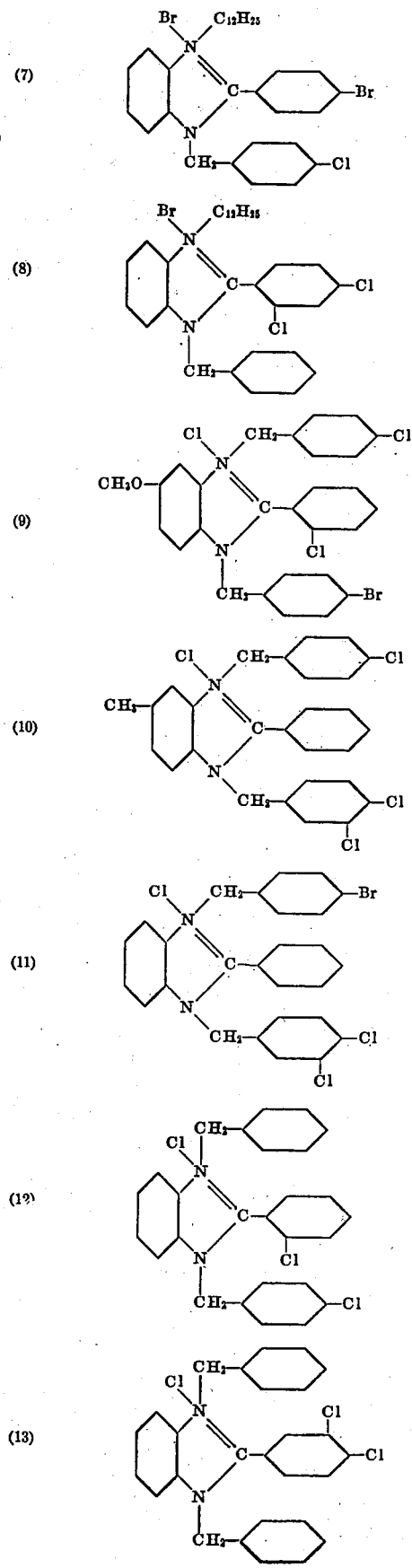

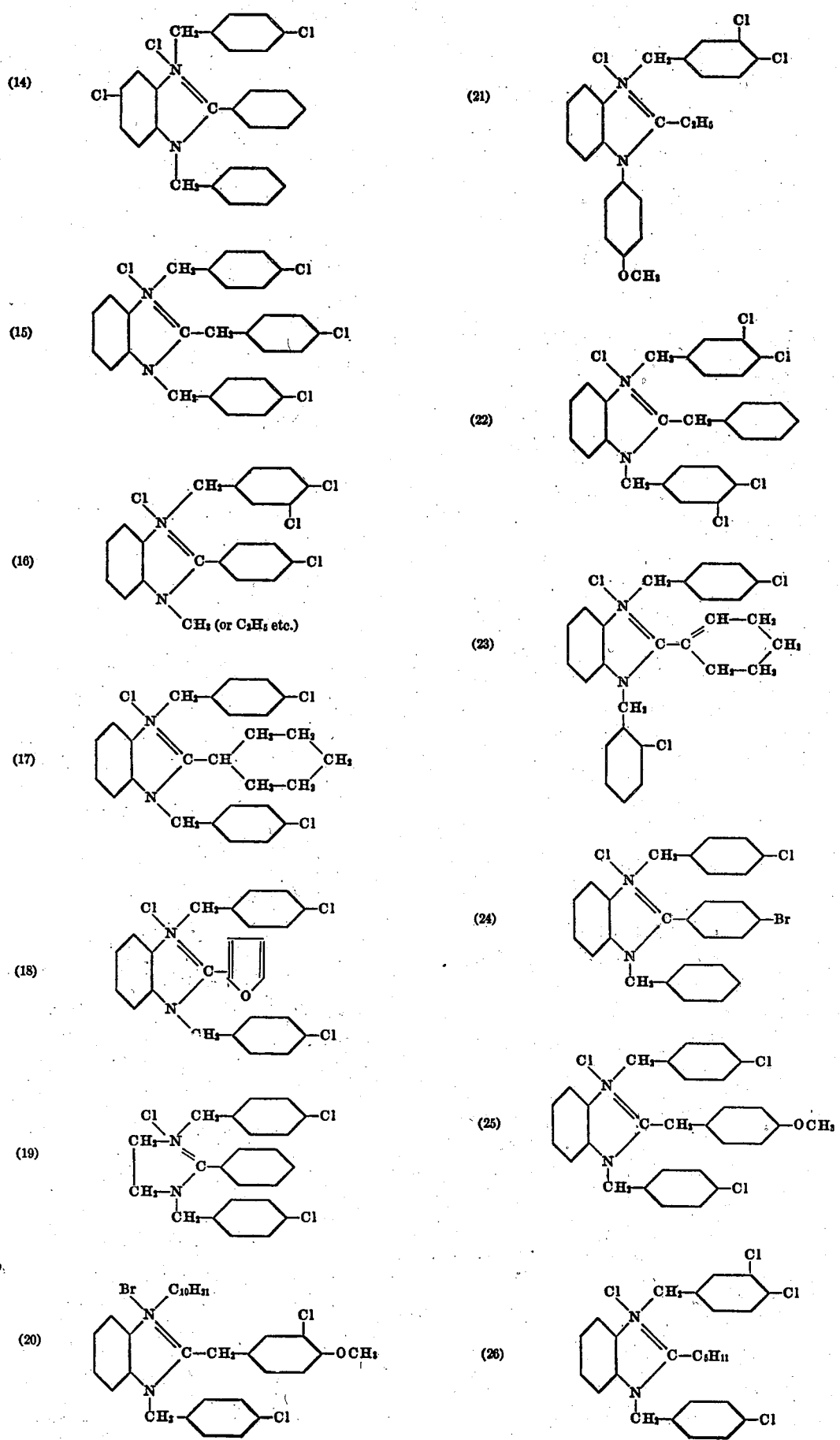

(27) 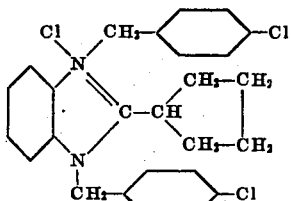

(28) 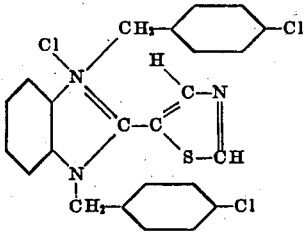

(29) 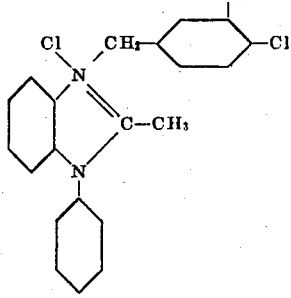

The manufacture of the products of the above Examples 7 to 29 takes place in an analogous manner as that of the Examples 2 to 6.

The present invention is not at all limited by the said examples. Many alternatives come into question in this class of compounds. As anions may especially be cited sulfate-, acetate-, lactate-, cyanide-ion and so on.

The cited amidines are applied exactly in the same manner as dyestuffs from an aqueous bath onto the material to be protected. They are already in small concentrations very efficacious. Textiles from animal fibres or furs, feathers and so on treated therewith are permanently protected against moths and some also against fungi and bacteria. The claimed compounds have, in part, a strongly wetting effect, a property which extremely facilitates the penetration of the materials to be treated with the aqueous solutions, thus effecting in short time a uniform protection against moths. The new agents can, of course, also be combined with other known moth-proofing agents.

Example 30

Furs, feathers or wool are treated for 1 hour at 95° C. with a neutral aqueous solution of the compound No. 9 of the above indicated composition, containing 0.5% of Glauber's salt, and dried. The thus treated product proves to be fast to moths which property does not disappear also after several washings or strong fullings.

What we claim is:

1. A moth-proofing composition, containing as its essential active ingredient a quaternary cyclic monoamidine of the benzene series of the following general formula:

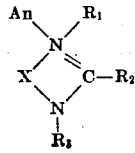

wherein $R_1$ means a member of the group consisting of high-molecular alkyl and benzyl radicals, $R_2$ means a member of the group consisting of aliphatic, benzyl, aromatic radicals of the benzene series, hydroaromatic and heterocyclic radicals, $R_3$ means a member of the group consisting of aliphatic, benzyl and aromatic radicals of the benzene series, X means a divalent aromatic radical of the benzene series connecting the two nitrogen-atoms, and An means an anion.

2. A moth-proofing composition, containing as its essential active ingredient a quaternary cyclic monoamidine of the benzene series of the following general formula:

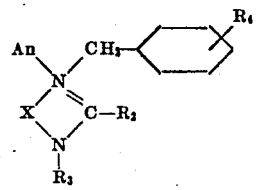

wherein $R_2$ means a member of the group consisting of aliphatic, benzyl, aromatic radicals of the benzene series, hydroaromatic and heterocyclic radicals, $R_3$ means a member of the group consisting of aliphatic, benzyl and aromatic radicals of the benzene series, X means a divalent aromatic radical of the benzene series connecting the two nitrogen-atoms, An means an anion, and $R_4$ means at least one member of the group consisting of H and halogen.

3. A moth-proofing composition, containing as its essential active ingredient a quaternary cyclic monoamidine of the benzene series of the following general formula:

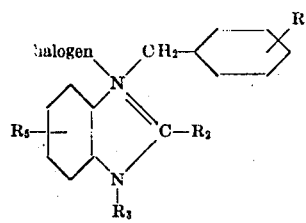

wherein $R_2$ means a member of the group consisting of aliphatic, benzyl, aromatic radicals of the benzene series, hydroaromatic and heterocyclic radicals, $R_3$ means a member of the group consisting of aliphatic, benzyl and aromatic radicals of the benzene series, $R_4$ means at least one member of the group consisting of H and halogen, and $R_5$ means a member of the group consisting of H, Cl, $OCH_3$ and $CH_3$.

4. A moth-proofing composition, containing as its essential active ingredient a quaternary cyclic monoamidine of the benzene series of the following general formula:

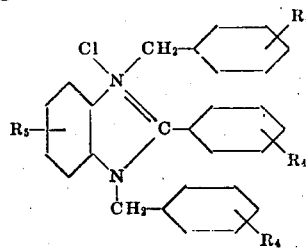

wherein $R_4$ means at least one member of the group consisting of H and halogen and $R_5$ means a member of the group consisting of H, Cl, $OCH_3$ and $CH_3$.

5. A moth-proofing composition, containing as its essential active ingredient a quaternary cyclic monoamidine of the benzene series of the following formula:

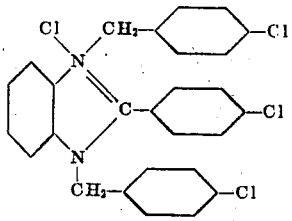

6. A moth-proofing composition, containing as its essential active ingredient a quaternary cyclic monoamidine of the benzene series of the following formula:

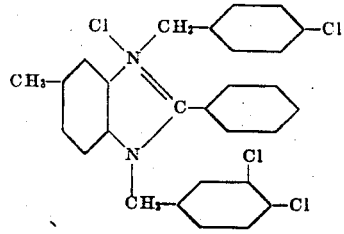

7. A moth-proofing composition, containing as its essential active ingredient a quaternary cyclic monoamidine of the benzene series of the following formula:

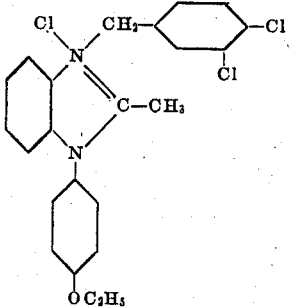

HENRY MARTIN.
HANS ZAESLIN.
CURT GLATTHAAR.
ALFRED STAUB.